(12) United States Patent
Herman

(10) Patent No.: US 11,199,438 B2
(45) Date of Patent: Dec. 14, 2021

(54) TRIBOELECTRIC-BASED CABLE SENSORS

(71) Applicant: Advanced Energy Industries, Inc., Fort Collins, CO (US)

(72) Inventor: Donnie Herman, Olcott, NY (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 282 days.

(21) Appl. No.: 16/542,582

(22) Filed: Aug. 16, 2019

(65) Prior Publication Data
US 2021/0048338 A1 Feb. 18, 2021

(51) Int. Cl.
*G01K 11/00* (2006.01)
*G01K 7/00* (2006.01)
*G01H 11/06* (2006.01)

(52) U.S. Cl.
CPC ............. *G01H 11/06* (2013.01); *G01K 7/00* (2013.01); *G01K 11/00* (2013.01)

(58) Field of Classification Search
None
See application file for complete search history.

(56) References Cited

U.S. PATENT DOCUMENTS

| | | | | |
|---|---|---|---|---|
| 2,787,784 A * | 4/1957 | Meryman | ................. | H01B 7/10 340/596 |
| 3,961,291 A * | 6/1976 | Whitehouse | ........... | G01H 3/125 333/156 |
| 4,183,010 A * | 1/1980 | Miller | ................... | H01L 41/087 367/154 |
| 4,374,299 A * | 2/1983 | Kincaid | ............. | H01B 11/1091 174/105 SC |
| 5,729,150 A | 3/1998 | Schwindt | | |
| 5,835,027 A * | 11/1998 | Tyburski | ................ | G08G 1/042 340/933 |
| 6,335,856 B1 * | 1/2002 | Boisrayon | ............. | H01L 41/042 310/311 |

(Continued)

FOREIGN PATENT DOCUMENTS

| | | | |
|---|---|---|---|
| CN | 203732638 U | * | 7/2014 |
| KR | 20180018291 A | * | 2/2018 |

(Continued)

OTHER PUBLICATIONS

CN203732638U Machine Translation (Year: 2021).*

(Continued)

*Primary Examiner* — David L Singer
(74) *Attorney, Agent, or Firm* — Neugeboren O'Dowd PC

(57) ABSTRACT

Systems and methods for monitoring an environmental parameter. A system includes a sensing cable configured to produce a triboelectric signal along at least one conductor of the cable and an electrostatic voltmeter coupled to the sensing cable and configured to provide an output signal responsive to the triboelectric signal. A conversion module is configured to convert the output signal to one or more parameter values indicative of the environmental parameter, and an interface provides a usable representation of the parameter value. The environmental parameter monitored may exemplarily be temperature monitored by the sensing cable as a thermally expandable/contractible semi-rigid coaxial cable, or the monitored environmental parameter may exemplary be vibration, movement, or force monitored by the sensing cable as a deformable coaxial cable.

20 Claims, 15 Drawing Sheets

(56) References Cited

U.S. PATENT DOCUMENTS

| | | | |
|---|---|---|---|
| 2004/0006258 A1* | 1/2004 | Meyer | G01L 5/0085 600/300 |
| 2005/0024210 A1* | 2/2005 | Maki | G08B 13/2497 340/566 |
| 2008/0024297 A1* | 1/2008 | Maki | H01B 11/1843 340/552 |
| 2008/0100300 A1 | 5/2008 | Williams | |
| 2016/0209278 A1* | 7/2016 | Hus | H01B 13/08 |

FOREIGN PATENT DOCUMENTS

| | | | | |
|---|---|---|---|---|
| KR | 20190107949 A | * | 9/2019 | G01N 27/002 |
| RU | 123197 U1 | * | 12/2012 | |

OTHER PUBLICATIONS

KR20180018291A Machine Translation (Year: 2021).*
KR20190107949A Machine Translation (Year: 2021).*
Yang et al, Coaxial Triboelectric Nanogenerator and Supercapacitor Fiber-Based Self-Charging Power Fabric, ACS Appl. Mater. Interfaces 2018, 10, 42356-42362 (Year: 2018).*
Maki, Conductive Sensor Cables for Perimeter Intrusion Detection, 2007 41st Annual IEEE International Carnahan Conference on Security Technology, 2007, pp. 163-168, doi: 10.1109/CCST.2007. 4373484. (Year: 2007).*
SENSTAR, Intelli-FLEX™ Perimeter Protection System-Relay Output Processor Product Guide (Year: 2008).*
Zhang et al, Self-Powered All-in-One Fluid Sensor Textile with Enhanced Triboelectric Effect on All-Immersed Dendritic Liquid-Solid Interface, ACS Appl. Mater. Interfaces 2018, 10, 30819-30826 (Year: 2018).*
Shahmiri et al, Serpentine: A Reversibly Deformable Cord Sensor for Human Input, CHI 2019, May 4-9, 2019, Glasgow, Scotland, UK (Year: 2019).*
Wikipedia, "Triboelectric Effect", Retrieved from https://en.wikipedia.org/wiki/Triboelectric_effect, "Known to exist as early as May 7, 2018", p. 2.

* cited by examiner

TRIBOELECTRIC-BASED CABLE SENSORS

BACKGROUND

Field

The present disclosure relates generally to sensing technologies, and more specifically, to triboelectric sensing technologies.

Background

Temperature sensing is used everywhere and can be accomplished by many different technological approaches. Some examples are thermistors, resistance temperature devices (RTDs), thermocouples, semiconductors type sensors, infrared sensors and more. The choice of which technology to use is based on the application, where factors such as cost, space requirements, temperature range, performance and stability are considered. The data from temperature sensing can be valuable for someone operating a system or process to have temperature information about a target area. The data can show various indicators important to a system operator, designer, or technician.

There are many needs to monitor temperatures with new sensor methods and form factors. For example, it may be important to notice faults and unexpected behavior in a system or to simply observe the system. The needs can be based on any custom application, and the common temperature sensing technologies listed above can be restricted in use if the application (e.g., a plasma processing chamber) places demands on the sensors that the sensors cannot meet. For example, an infrared sensor may not work well for certain surfaces. A thermocouple may be accuracy-limited and require nonlinear conversion. RTDs have a higher price because its constituent elements include copper and nickel, which are difficult to repeatedly reproduce as a sensor. All of these deficiencies may present problems in a vacuum chamber or similar environment. Thus, there is a need to offer a very custom sensor shape because history has shown that each customer has a different need.

As another example, vibration, movement, and force sensing are used virtually everywhere and can be accomplished by many different technological approaches. Some examples are accelerometer sensors, piezoelectric movement sensors, laser displacement sensors, micro velocity sensors, strain-gauge-based sensors, capacitive displacement sensors and more.

The choice of which technology to use is based on the application, and material factors include cost, space requirements, temperature, shock magnitude, performance and stability. The data from vibration sensing (e.g., mechanical vibration information about a target area) can be valuable for someone operating a system or process. For example, the data can show potential faults and errors such as an early wearing of bearings in a fan.

There are many advantages to being able to monitor a processes' vibration such as, for example, noticing faults and unexpected behavior in a system. The advantages can be dependent upon any custom application and certain vibration sensing technologies can be restricted in use if the limitations are too great. For example, a laser displacement sensor can measure extremely precise vibration, but the technology is restricted to the lab, is expensive, and is not practical for field use. An accelerometer may be performance limited and is restricted to areas where an integrated circuit can survive and remain reliable. Thus, there is a need to offer custom and economically viable sensor shapes due to the variety of different needs.

SUMMARY

According to an aspect, a method for monitoring an environmental parameter is disclosed. The method includes exposing a cable to a variable environmental parameter, wherein the cable changes shape in response to changes in the variable environmental parameter. The method also includes monitoring a triboelectric signal on a conductor of the cable with an electrostatic voltmeter to obtain an output signal. Characterization data is accessed using the output signal to obtain a stored parameter value for the environmental parameter, and an aspect of the monitored environment is managed using the parameter value.

According to another aspect, a system for monitoring an environmental parameter is disclosed. The system includes a cable configured to produce a triboelectric signal along at least one conductor of the cable and an electrostatic voltmeter coupled to the cable and configured to provide an output signal responsive to the triboelectric signal. A conversion module is configured to convert the output signal to one or more parameter values indicative of the environmental parameter, and an interface provides a usable representation of the parameter value.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Aspects disclosed herein include a new analog sensor solution that combines an electrostatic voltmeter (ESVM) and a triboelectric-based cable to measure one or more environmental parameter values such as temperature, vibration, movement, and/or forces. A variety of different types of cables (e.g., semi-rigid coax cable and soft coax cable sensors) may be utilized to provide solutions to measuring parameters in a range of tight spaces and environments. As disclosed further herein, the semi-rigid coax cable provides a small, but accurate, electronic signal that represents temperature, and the soft coax cable provides a small, but accurate electronic signal that represents movement.

The ESVM provides an ultra-high impedance and low drift input to buffer these triboelectric signals with virtually no added signal distortion. The result is a buffered and amplified analog output that represents an environmental parameter. Coupling the triboelectric signal with the ESVM brings the possible bandwidth and/or sensitivity to a higher level. For sensitive applications that produce small triboelectric signals, the gain can be increased to intensify the measured parameter data simply by increasing the cable's surface area on the application, such as by wrapping many turns of the cable around a target area.

The variable capacitance and triboelectric behavior of the cables that are used produce a signal when the cable's materials expand or contract based on the environmental parameter. Triboelectric cable charges are typically undesired in analog designs because triboelectric signals may pollute clean signals with unwanted harmonics. Aspects disclosed herein counterintuitively use these triboelectric signals that are often removed as "noise."

The triboelectric signals from the cables are very weak, but Applicant has found that an ESVM provides a buffer useful to strengthen the triboelectric signal while providing an input bias current and drift that is ultra-low. In addition, the ESVM may provide temperature compensation and a driven shield, which are traits useful in the context of monitoring triboelectric signals. As disclosed in more detail further herein, the ESVM may condition any output curve of the cable (e.g., temperature versus volts) to a desired range.

Figure 1:
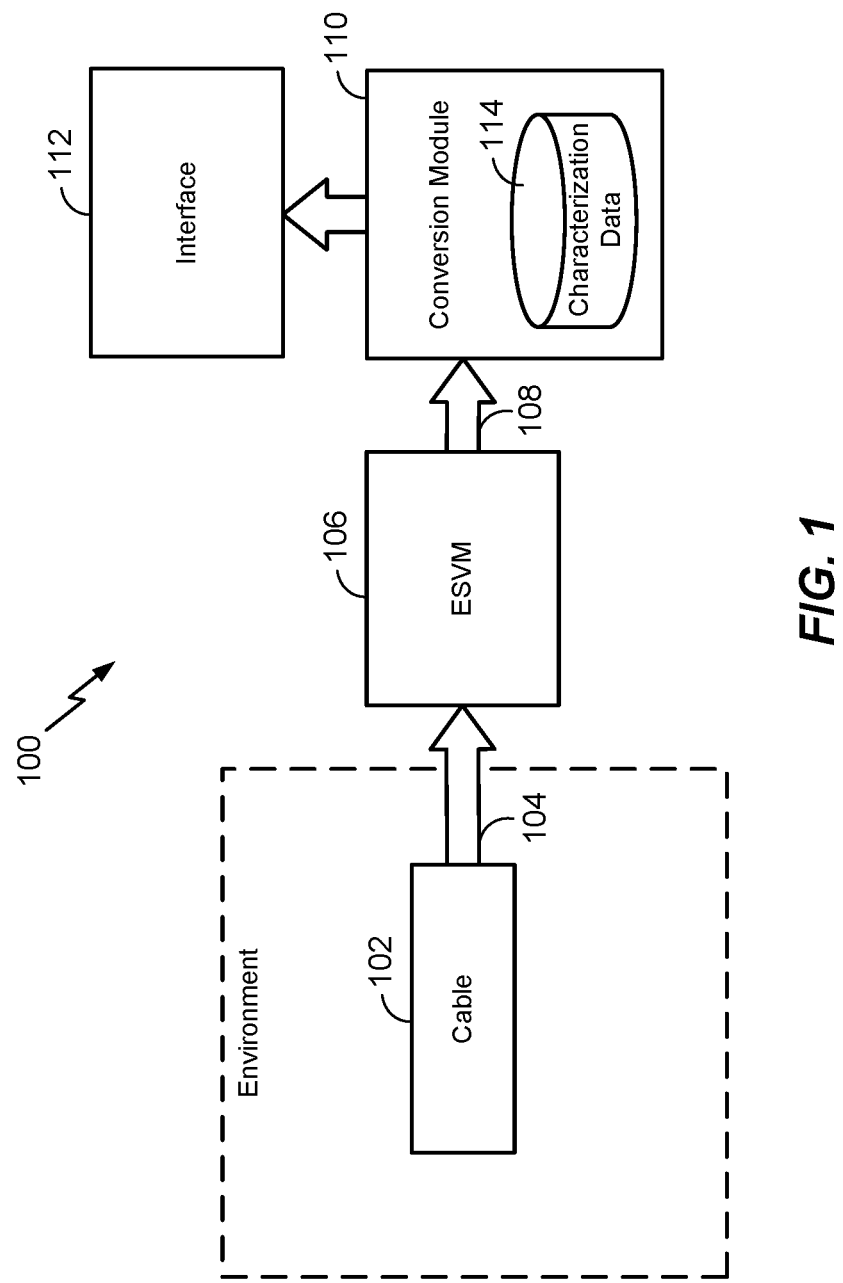
FIG. 1 is a block diagram depicting a system for monitoring an environmental parameter.

Referring first to FIG. 1, shown is a block diagram depicting a system 100 for monitoring an environmental parameter such as temperature or vibrations. As shown, the system 100 includes a cable 102 positioned in an environment that includes one or more environmental parameters that are monitored. As described further herein, the cable 102 includes a conductor that propagates a triboelectric signal 104 to an electrostatic voltmeter (ESVM) 106 that is coupled to the cable 102. The ESVM 106 in this system 100 is configured to provide a buffered output signal 108 responsive to the triboelectric signal 104. As shown, the system 100 includes a conversion module 110 configured to convert the output signal 108 to one or more parameter values indicative of the environmental parameter, and the system 100 includes an interface 112 to provide a usable representation of the parameter value(s). As shown, the conversion module 110 may include a datastore 114 comprising characterization data that includes a plurality of data pairs, wherein each data pair may include a parameter value and a corresponding signal value. In operation, the conversion module 110 is configured to obtain a signal value from the electrostatic voltmeter 106 and obtain a corresponding parameter value from the characterization data.

To generate the characterization data, the cable 102 may be placed in a controlled environment where a precision meter may be used to provide parameter values that are stored in connection with empirically obtained signal values that are output from the ESVM 106. For example, a temperature of the controlled environment may be adjusted (using a heat source and precision thermometer) to each of N temperature values, and a signal value is obtained from the ESVM 106 (and stored in the datastore 114) for each temperature value so that N signal values are obtained. When characterization is complete, there will be N data pairs, wherein each data pair includes a parameter value (e.g., a temperature value) and a corresponding stored signal value (e.g., a voltage value). Those of ordinary skill in the art will appreciate that a similar process may be carried out for vibrations so that signal values are stored in connection with values that characterize vibrations.

The conversion module 110 and interface 112 may be realized as a separate, unitary device that may be added as a separate component to the ESVM 106. In the alternative, the ESVM 106, conversion module 110, and the interface 112 may be implemented within a common housing. It is also contemplated that the ESVM 106, the conversion module 110, the interface 112, and the datastore (including characterization data) 114 may be distributed such that one or more components reside within separate housings or separate devices. In other implementations, the ESVM 106, the conversion module 110, and interface 112 may be integrated within another device such as, for example, a motor housing, breaker panel, match network, power supply, or any of a variety of devices that create, or are associated with, an environment that is desirable to monitor.

The cable 102 may be realized by a variety of different types and sizes of cables, which may be selected based upon the application and/or the parameter(s) being monitored. Exemplary cable types and applications are discussed further herein.

Figure 2:
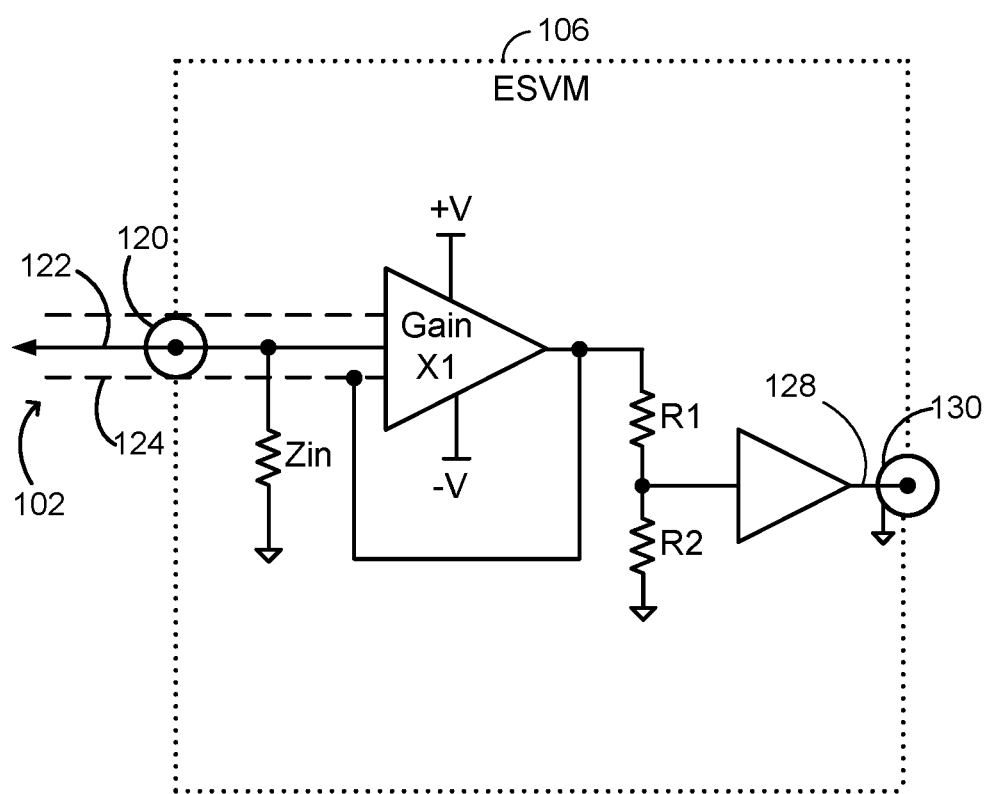
FIG. 2 is a schematic drawing of an exemplary implementation of the electrostatic voltmeter depicted in FIG. 1.

Referring next to FIG. 2, shown is an exemplary embodiment of the ESVM 106. As shown, the ESVM 106 in this embodiment includes a connector 120 (e.g., a subminiature version C (SMC) connector) to conductively couple an amplifier within the ESVM 106 to the cable 102, which includes an inner conductor 122 and an outer conductor 124. As shown, an impedance control resistor may be coupled between the center conductor 122 and ground. The impedance control resistor may be a high value resistor that is used to match an input impedance of the ESVM 106 to the impedance presented to the ESVM 106 by the cable 102. An exemplary range of values of the impedance control resistor is from 1M ohms to 100 T ohms. The amplifier of the ESVM 106 may be configured to amplify the monitored voltage in a 1:1 ratio in range from −V to +V where V may be set depending upon the particular application. For example, the rails of the ESVM 106 may be +/− 1V in some implementations and may be +/− 100V in other implementations.

As shown, the output of the amplifier of the ESVM 106 feeds to a voltage divider (implemented by resistors R1 and R2) that effectuates a reduced voltage at the input of a simple buffer that, in turn, provides as an output signal 128 to an output connector 130 (e.g., SMC connector). For example, in implementations where the rails of the ESVM 106 are +/− 100V, the output signal 128 may be a scaled down signal (e.g., ±10V). The output signal 128 is indicative of the triboelectric signal on the cable 102 produced by the deformation of the cable 102, and hence, the output signal 128 is indicative of an environmental parameter that caused the deformation of the cable 102.

Figure 3:
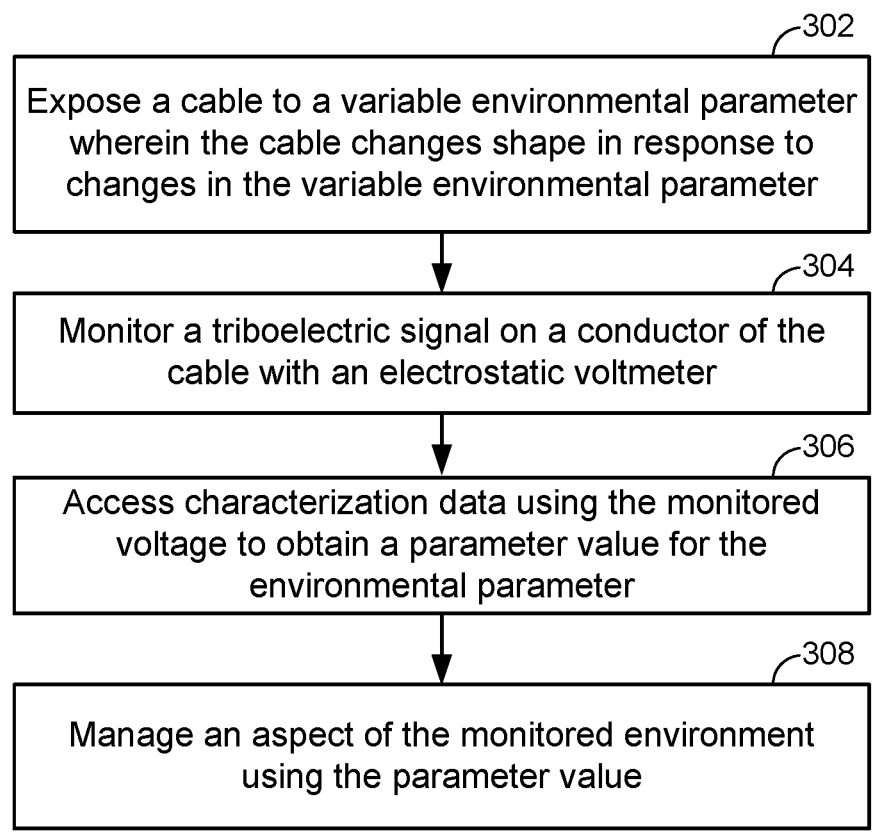
FIG. 3 is a flowchart depicting a method that may be traversed in connection with embodiments disclosed herein.

Referring next to FIG. 3, shown is a flowchart depicting a method that may be traversed in connection with embodiments disclosed herein. As shown, the method includes exposing the cable 102 to a variable environmental parameter wherein the cable 102 changes shape in response to changes in the variable environmental parameter (Block 302). A triboelectric signal that results from the changing shape of the cable 102 is generated on a conductor of the cable 102, and the ESVM 106 monitors the triboelectric signal (Block 304). As discussed above, characterization data in the datastore 114 is accessed using a signal value from the output signal monitored voltage to obtain a parameter value for the environmental parameter (Block 306). As shown, the parameter value may be used to manage an aspect of the monitored environment (Block 308). Discrete real-time values of the parameter value may be presented to an operator of the system 100 via the interface 112, and/or the conversion module 110 may integrate the parameter values over time (e.g., to provide a running average of the parameter values).

Figure 4:
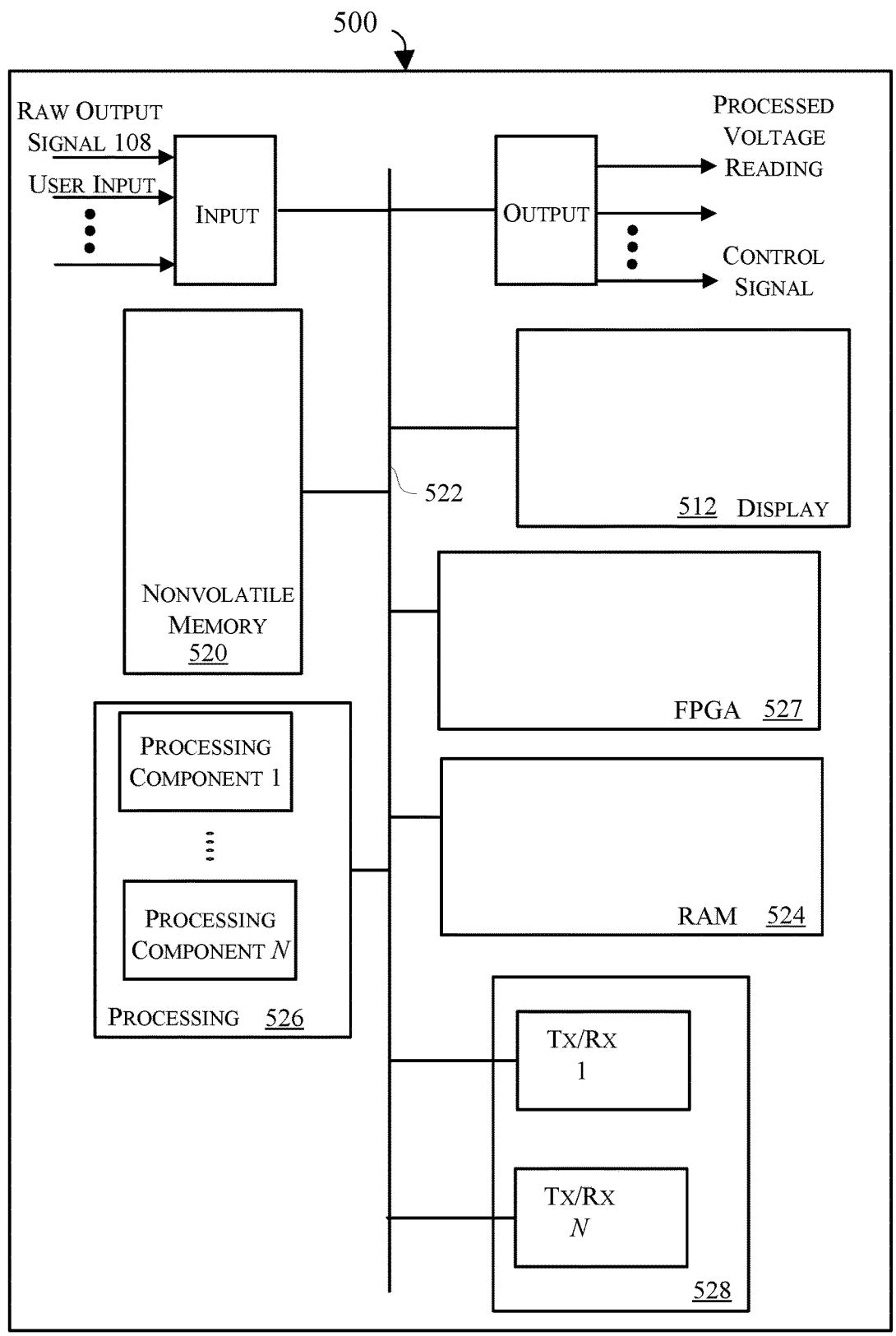
FIG. 4 is a block diagram depicting exemplary processing components that may be used to realize some embodiments disclosed herein.

The methods described in connection with the embodiments disclosed herein may be embodied directly in hardware, in processor executable instructions encoded in non-transitory machine readable medium, or as a combination of the two. Referring to FIG. 4 for example, shown is a block diagram depicting physical components of an exemplary controller 500 that may be utilized to realize aspects of the conversion module 110 according to an illustrative embodiment of this disclosure. As shown, in this embodiment a display 512 and nonvolatile memory 520 are coupled to a bus 522 that is also coupled to random access memory ("RAM") 524, a processing portion (which includes N processing components) 526, a field programmable gate array (FPGA) 527, and a transceiver component 528 that includes N transceivers. Although the components depicted in FIG. 4 represent physical components, FIG. 4 is not intended to be a detailed hardware diagram; thus, many of the components depicted in FIG. 4 may be realized by common constructs or distributed among additional physical components. Moreover, it is contemplated that other existing and yet-to-be developed physical components and architectures may be utilized to implement the functional components described with reference to FIG. 4.

The display 512 generally operates to provide a user interface for a user, and in several implementations, the display 512 is realized by a touchscreen display. For example, display 512 can be used to control and interact with the ESVM 106 and the conversion module 110. For example, the display 512 may display parameter value(s) such as temperature or indicia of vibrations such as frequency or wobble. In general, the nonvolatile memory 520 is non-transitory memory that functions to store (e.g., persistently store) data and machine readable (e.g., processor executable) code (including executable code that is associated with effectuating the methods described herein). In some embodiments, for example, the nonvolatile memory 520 includes bootloader code, operating system code, file system code, and non-transitory processor-executable code to facilitate the execution of the methods described herein including the method described with reference to FIG. 4.

In many implementations, the nonvolatile memory 520 is realized by flash memory (e.g., NAND or ONENAND memory), but it is contemplated that other memory types may also be utilized. Although it may be possible to execute the code from the nonvolatile memory 520, the executable code in the nonvolatile memory is typically loaded into RAM 524 and executed by one or more of the N processing components in the processing portion 526. And the nonvolatile memory 520 may be used to realize the datastore 114 that stores the characterization data discussed above.

In operation, the N processing components in connection with RAM 524 may generally operate to execute the instructions stored in nonvolatile memory 520 to realize aspects of the conversion module 110. For example, non-transitory processor-executable instructions to effectuate the methods described with reference to FIG. 3 may be persistently stored in nonvolatile memory 520 and executed by the N processing components in connection with RAM 524. As one of ordinary skill in the art will appreciate, the processing portion 526 may include a video processor, digital signal processor (DSP), graphics processing unit (GPU), and other processing components.

In addition, or in the alternative, the field programmable gate array (FPGA) 527 may be configured to effectuate one or more aspects of the methodologies described herein. For example, non-transitory FPGA-configuration-instructions may be persistently stored in nonvolatile memory 520 and accessed by the FPGA 527 (e.g., during boot up) to configure the FPGA 527 to effectuate the functions of the controller 114.

In general, the input component functions to receive analog and/or digital signals such as, for example, the output signal 128 or user input. It should be recognized that the input component may be realized by several separate analog and/or digital input processing chains, but for simplicity, the input component is depicted as a single functional block. In an exemplary mode of operation, the input component may operate to receive the output signal 108 from the ESVM 106 (that is indicative of the triboelectric signal on the cable 102) and processor-executable instructions prompt characterization data in nonvolatile memory 520 to be accessed to obtain parameter values that represent, for example, temperature and/or vibration attributes. The output component may be used to provide one or more analog or digital signals to effectuate one or more operational aspects of the ESVM 106 and the conversion module 110. For example, the output portion may provide the control voltage to the ESVM 106 to control a gain and/or rail voltage of the amplifier. The output component may also be used to provide a processed voltage reading that is a representation of the raw output signal 108 from the ESVM 106.

It is also contemplated that the output component may provide a control signal to control (e.g., as a feedback signal) the environmental parameter that is being monitored. For example, the control signal may be coupled to a temperature control system that heats and/or cools the environment. As another example, the control signal may be coupled to a variable speed drive that controls a speed of a motor (e.g., to remove a sensed vibration). But it should be recognized that alternative systems to the controller 500 may be used to convert the output signal 128 to a feedback control signal.

The depicted transceiver component 528 includes N transceiver chains, which may be used for communicating with external devices via wireless or wireline networks. Each of the N transceiver chains may represent a transceiver associated with a particular communication scheme (e.g., WiFi, ethernet, universal serial bus, profibus, etc.).

Figure 5:
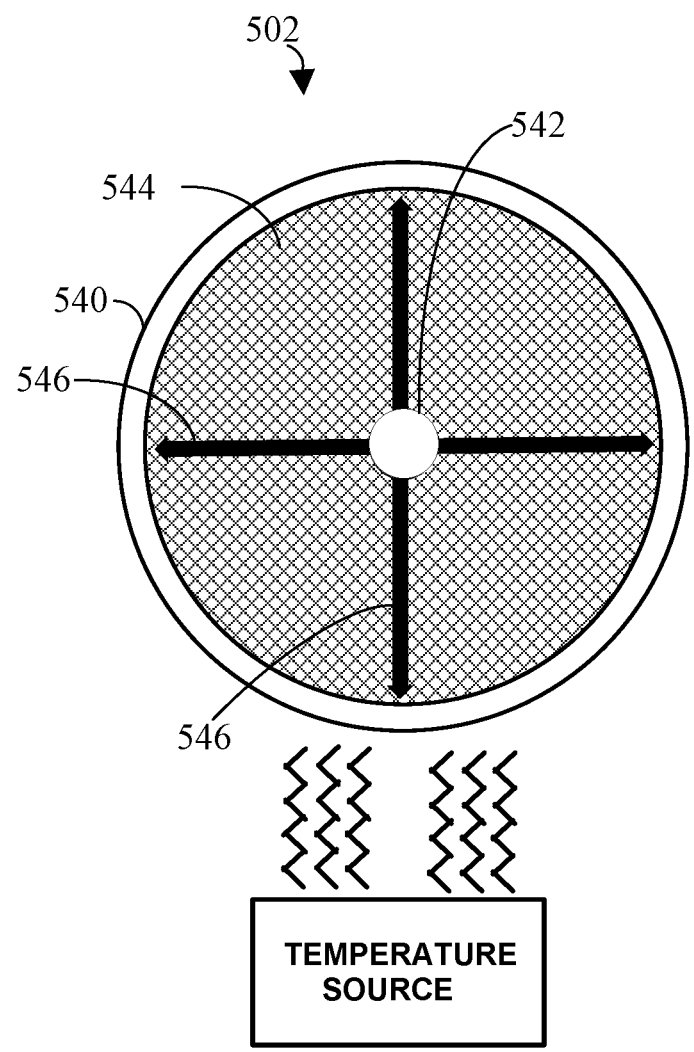
FIG. 5 depicts a cut-a-way view of a cable that may be used in connection with temperature sensing applications.

Referring next to FIG. 5 shown is a cut-a-way view of a semi-rigid micro coaxial cable 502 that may be used in connection with temperature sensing applications. As shown, the cable 502 may include an outer copper jacket 540, an axial center conductor 542, and a polytetrafluoroethylene (PTFE) insulator 544 interposed between the outer copper jacket 540 and the axial center conductor 542. Although other diameters are certainly contemplated, the cable 502 may have a 1.0 millimeter outer diameter. As shown, the solid outer copper jacket 540 allows force 546 to be directed on internal portions of the cable 502 during expansion or contraction; thus, inducing a triboelectric charge along the center conductor 542.

Figure 6:
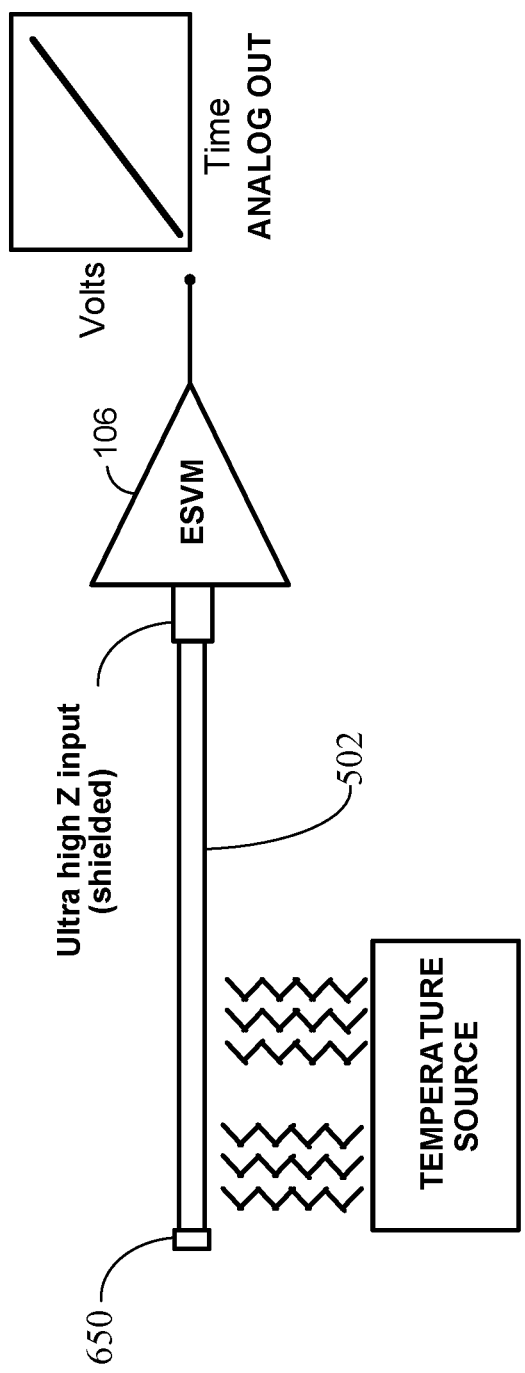
FIG. 6 depicts a schematic view of a temperature sensing application.

Referring to FIG. 6, shown is an exemplary application of the cable 502 and ESVM 106 in an environment with a temperature source. As shown, the cable 502 may include a shielded cap 650 or soldered coax shield, and the center conductor 542 may be left open. As shown, the output signal 108 of the ESVM 106 may be an analog signal that varies with the temperature of the of the environment. In some implementations, the output signal 108 varies substantially linearly with the temperature in the environment, but one of ordinary skill in the art will appreciate that if the output signal is non-linear, non-linear compensation may be applied by the conversion module 110.

Figure 7:
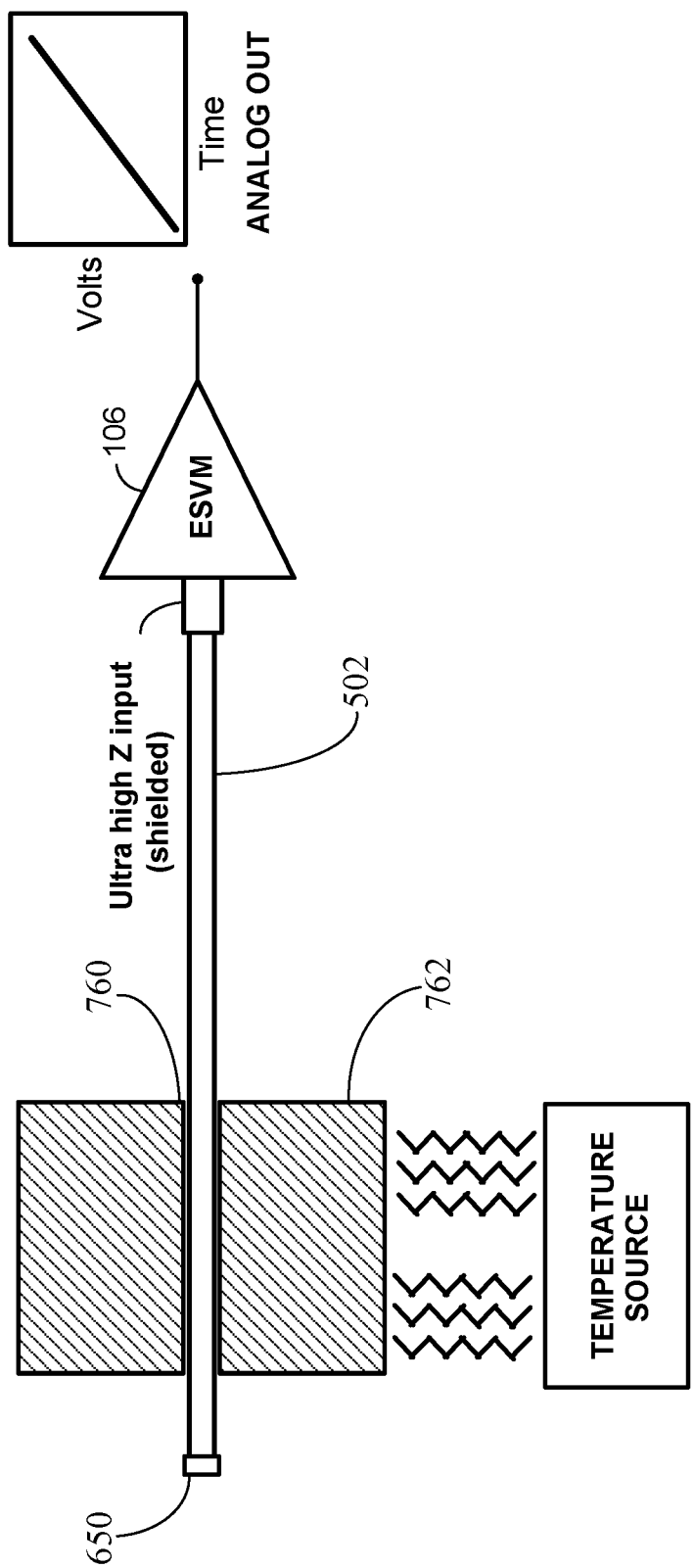
FIG. 7 depicts another temperature sensing application.

Referring next to FIG. 7, shown is another application of the cable 502 described with reference to FIG. 5. As shown, the cable 502 may be positioned within a bore 760 of a heat-conducting mass 762 (e.g., metallic block or chassis) to provide a temperature measurement of the heat-conducting mass 762. The heating-conducting mass 762 may be any of a variety of materials that conduct heat to the cable 502 such as aluminum, copper, steal, etc. And the heat-conducting mass 762 may be a portion of any construct where it is desirable to monitor temperature.

Figure 8:
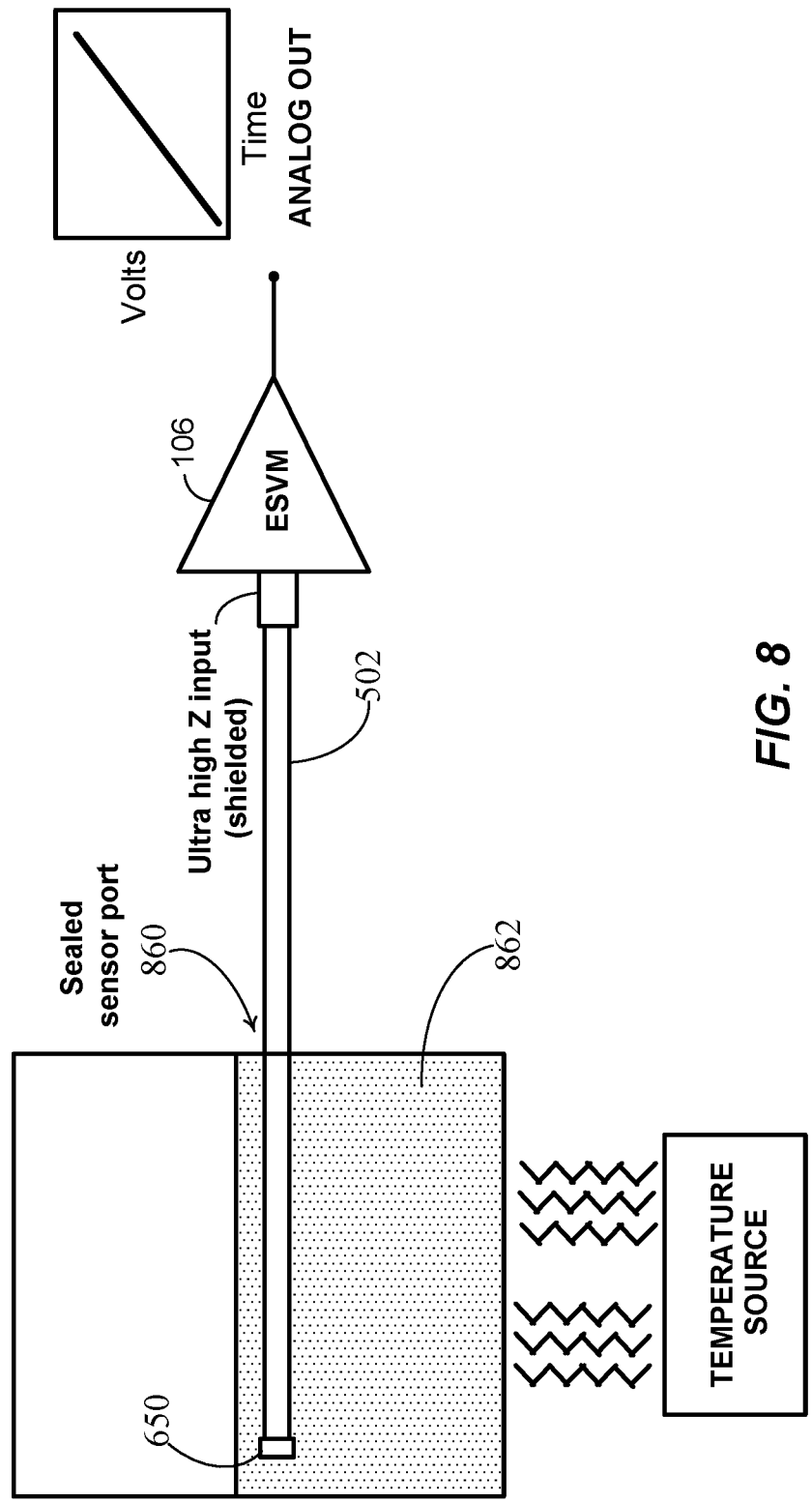
FIG. 8 depicts a yet another temperature sensing application.

As shown in FIG. 8, the cable 502 may also be positioned within a non-solid body 862 (e.g., liquid or powder) to obtain temperature measurements of the non-solid body 862. As shown, the cable 502 may feed through a containment vessel via a sealed sensor port 860.

Figure 9:
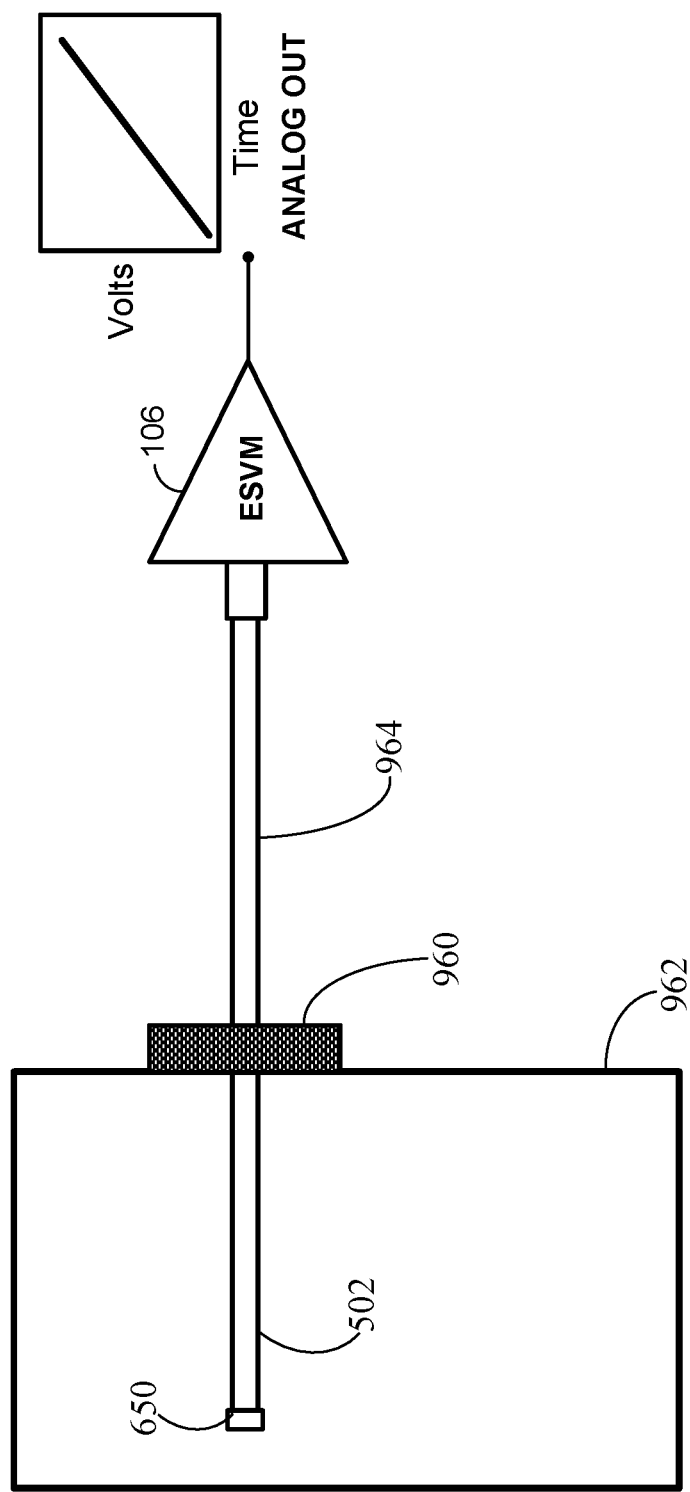
FIG. 9 depicts another temperature sensing application.

The cable 1002 may also be positioned within a plasma processing chamber 962 as shown in FIG. 9. As depicted, the cable 1002 may be used within the plasma processing chamber 962 while a standard ESVM cable 964 may be utilized outside of the plasma processing chamber 962. The cable 502 may couple to the standard ESVM cable 964 within or in close connection with a chamber feed through portion 960.

Figure 10:
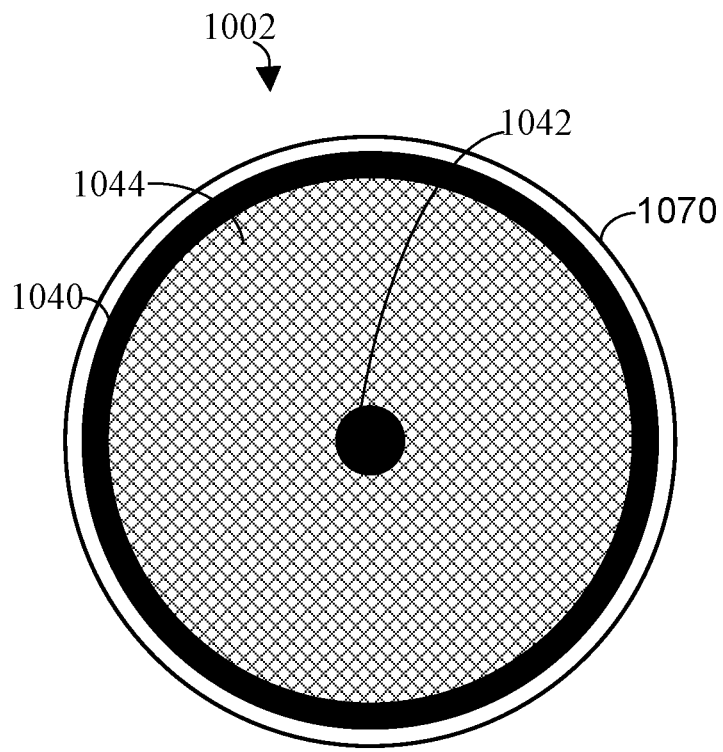
FIG. 10 depicts a cut-a-way view of a cable that may be used in connection with vibration sensing applications.

Referring next to FIG. 10, shown is a cut-a-way view of another cable 1002 that may be used to realize the cable 102 depicted in FIG. 1. As shown, the cable 1002 includes an outer conductive jacket 1040, a center conductor 1042, and a dielectric insulator 1044 (e.g., PTFE) interposed between the outer conductive jacket 1040 and the center conductor 1042. In addition, the cable 1002 may include an outer insulative jacket 1070 that surrounds the outer conductive jacket 1040. The outer conductive jacket 1040 and the center conductor 1042 may be made of copper, and the outer insulative jacket 1070 may be made of rubber, but it is certainly contemplated that other types of materials may be utilized for these portions of the cable 1002.

Figure 11:
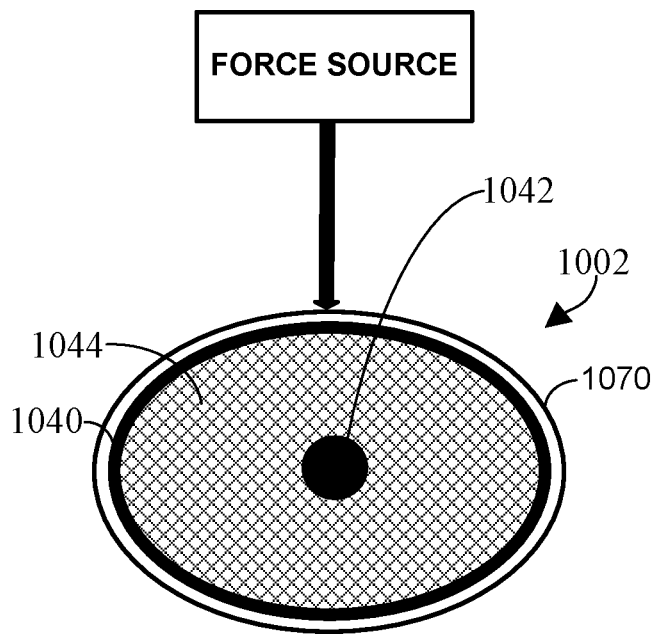
FIG. 11 depicts a cut-a-way view of the cable depicted in FIG. 10 that has been deformed by an applied force.

In operation, the cable 1002 may be deformed (as shown in FIG. 11) in response to a force that is applied to the cable 1002. The materials of the cable 1002 that separate and move on a micro level generate charge that is produced on the conductors of the cable 1002. In addition, the change in the shape of the dielectric insulator 1044 creates a variable capacitance, which in turn, produces a signal on the conductors of the cable 1002 that the ESVM 106 detects.

Figure 12:
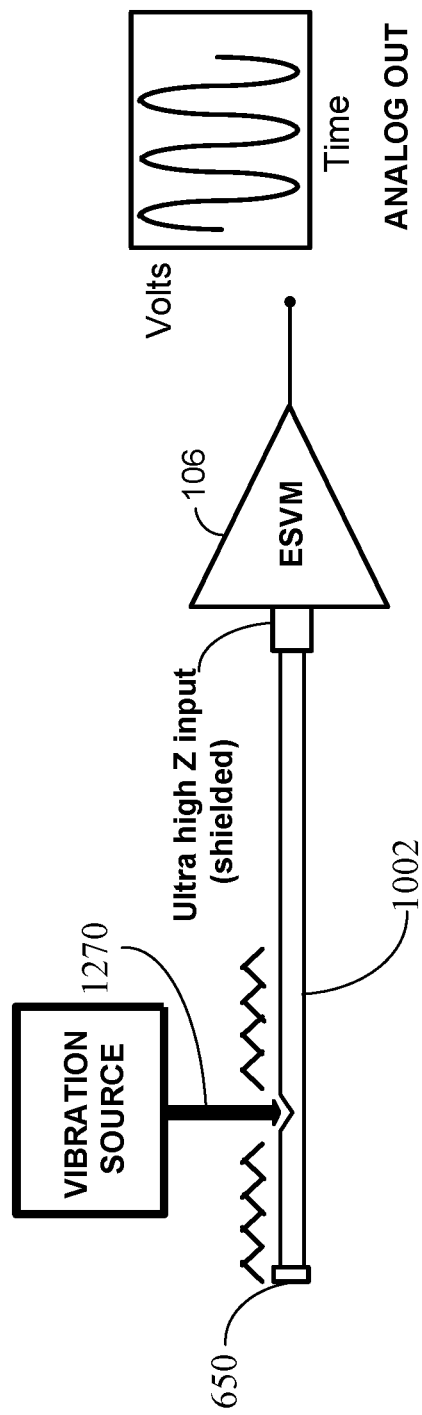
FIG. 12 depicts a schematic view of a vibration sensing application.

Referring next to FIG. 12, the cable 1002 is shown positioned in an environment that includes a vibration source that changes a shape of the cable 1002; thus, producing a triboelectric signal on the cable 1002 that is detectable by the ESVM 106. As shown, a vibration source may be connected to the cable 1002 via coupling member 1270 that translates motion of the vibration source to the cable 1002. In the context of vibration sensing, the output signal 108 of the ESVM 106 may include a time varying signal that corresponds to vibrations produced by the vibration source. As one of ordinary skill in the art will appreciate in view of this disclosure, the output signal 108 may be processed by the conversion module 110 to provide values of the output signal 108 or statistical values that represent the output signal 108.

Figure 13:
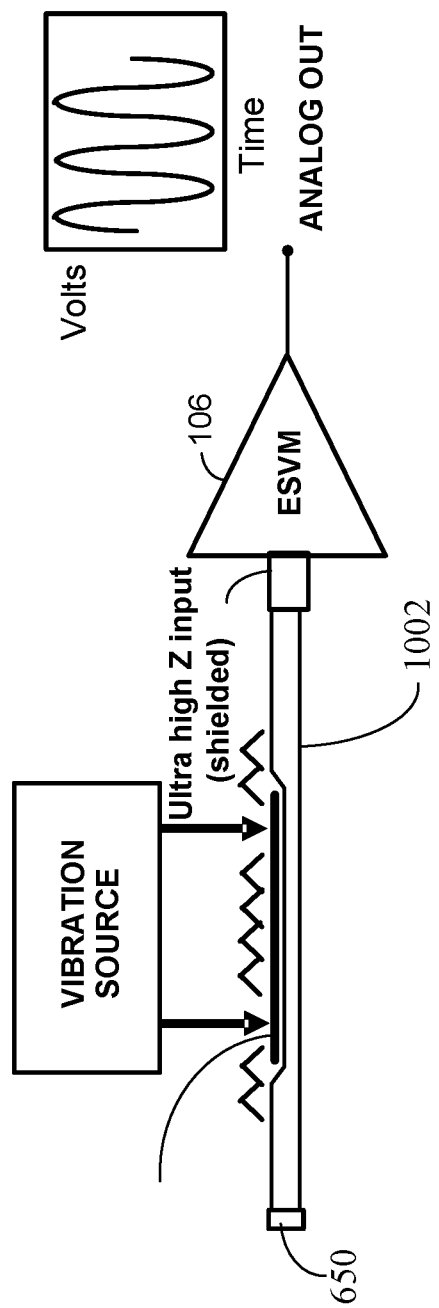
FIG. 13 depicts another vibration sensing application.

Referring to FIG. 13, shown is another application where a vibration source is coupled to the cable 1002 via a plate to more evenly distribute motion due to vibrations across the cable 1002. This enables vibrations from large areas to be obtained for high gain.

Figure 14:
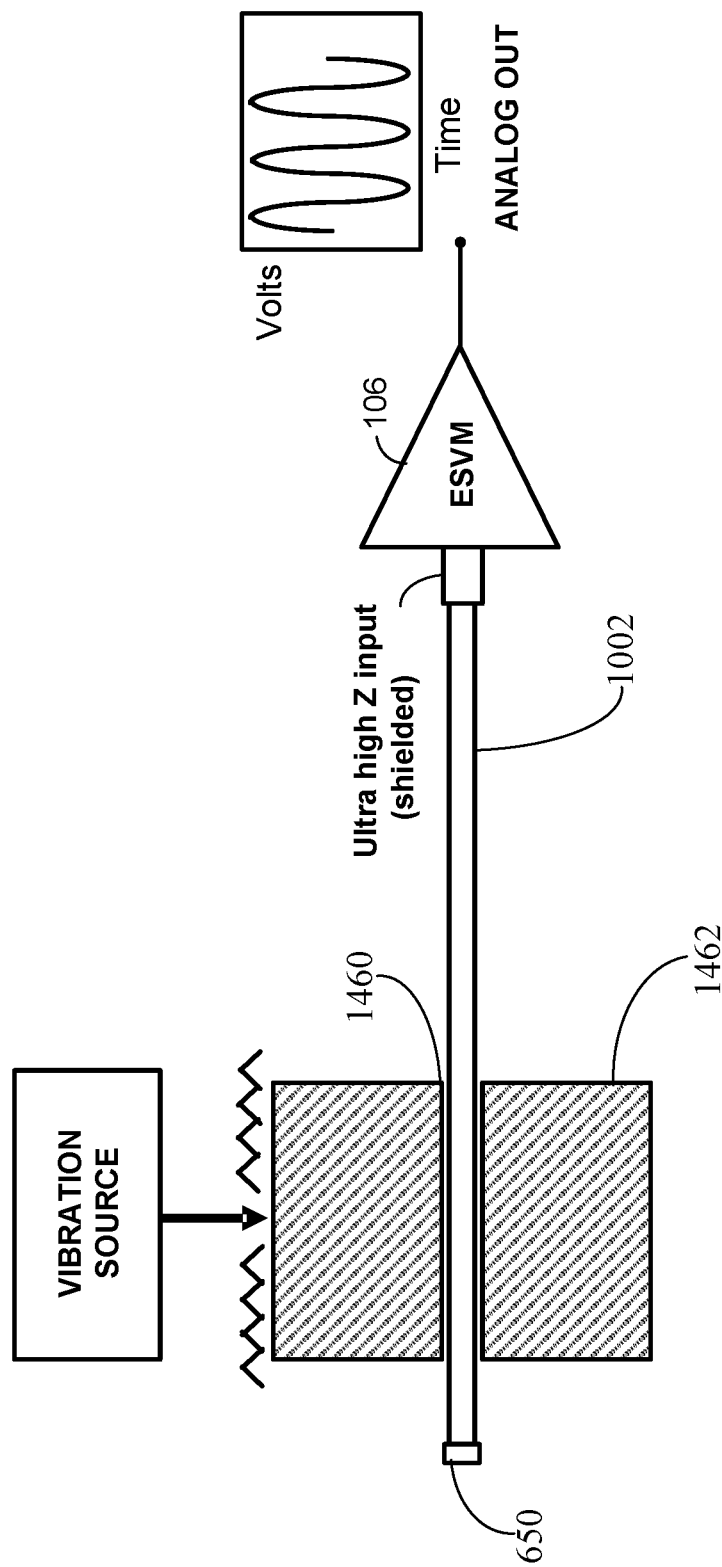
FIG. 14 depicts a yet another vibration sensing application.

Referring next to FIG. 14, shown is an exemplary application in which the cable 1002 is positioned within a bore 1460 of a motion-translating mass 1462 to provide a vibration measurement of the motion-translating mass 1462. The motion-translating mass 1462 may be any of a variety of materials that translate motion to the cable 1002 such as insulators or metals. An the motion-translating mass 1462 may be a portion of any construct where it is desirable to monitor motion such as vibrations.

Figure 15:
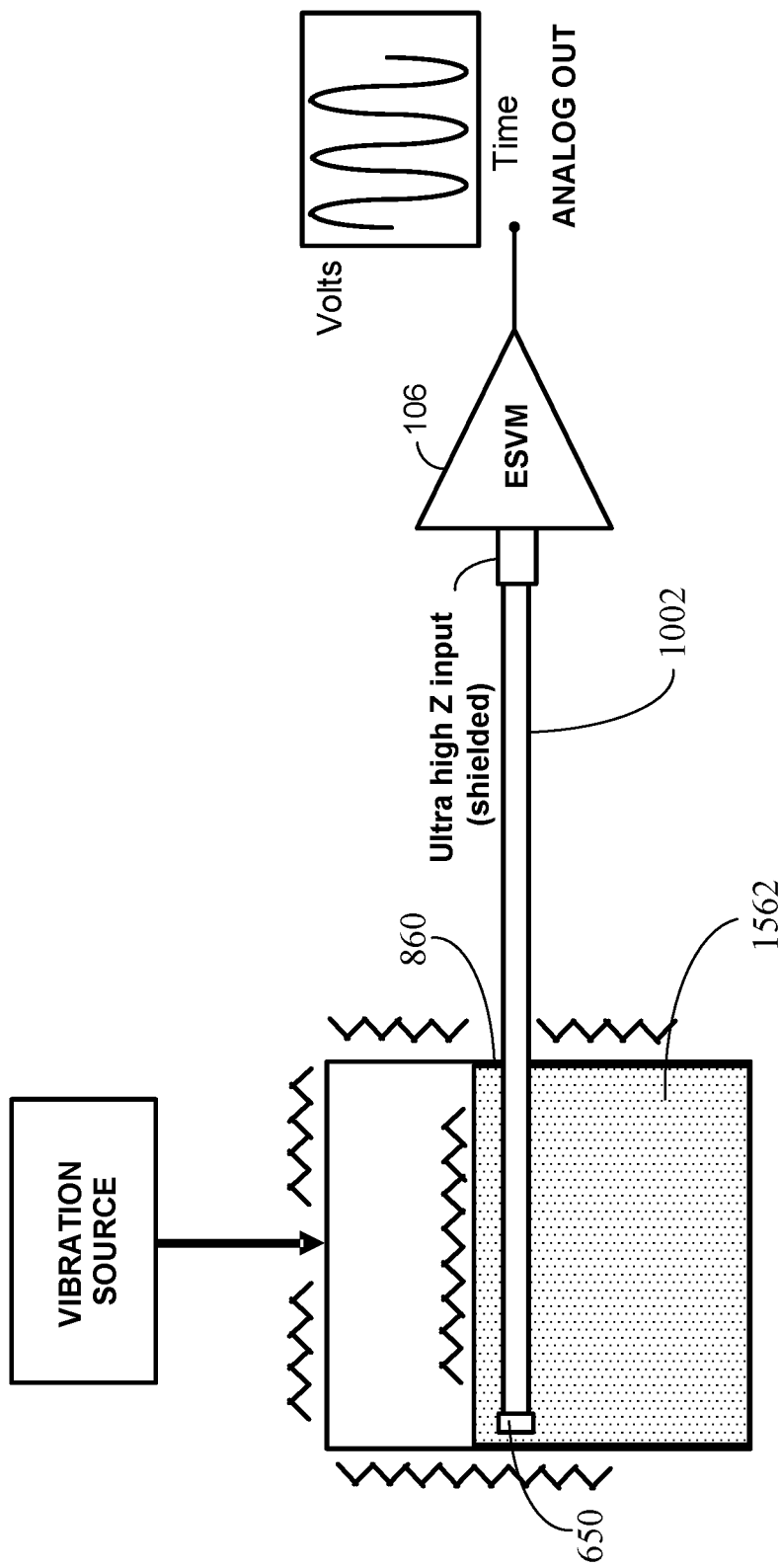
FIG. 15 depicts another vibration sensing application.

As shown in FIG. 15, the cable 1002 may also be positioned to detect vibrations within a non-solid body 1562 (e.g., liquid or powder) to obtain vibration measurements within the non-solid body 1562. As shown, the cable 1002 may feed through a containment vessel via a sealed sensor port 1560.

Figure 16:
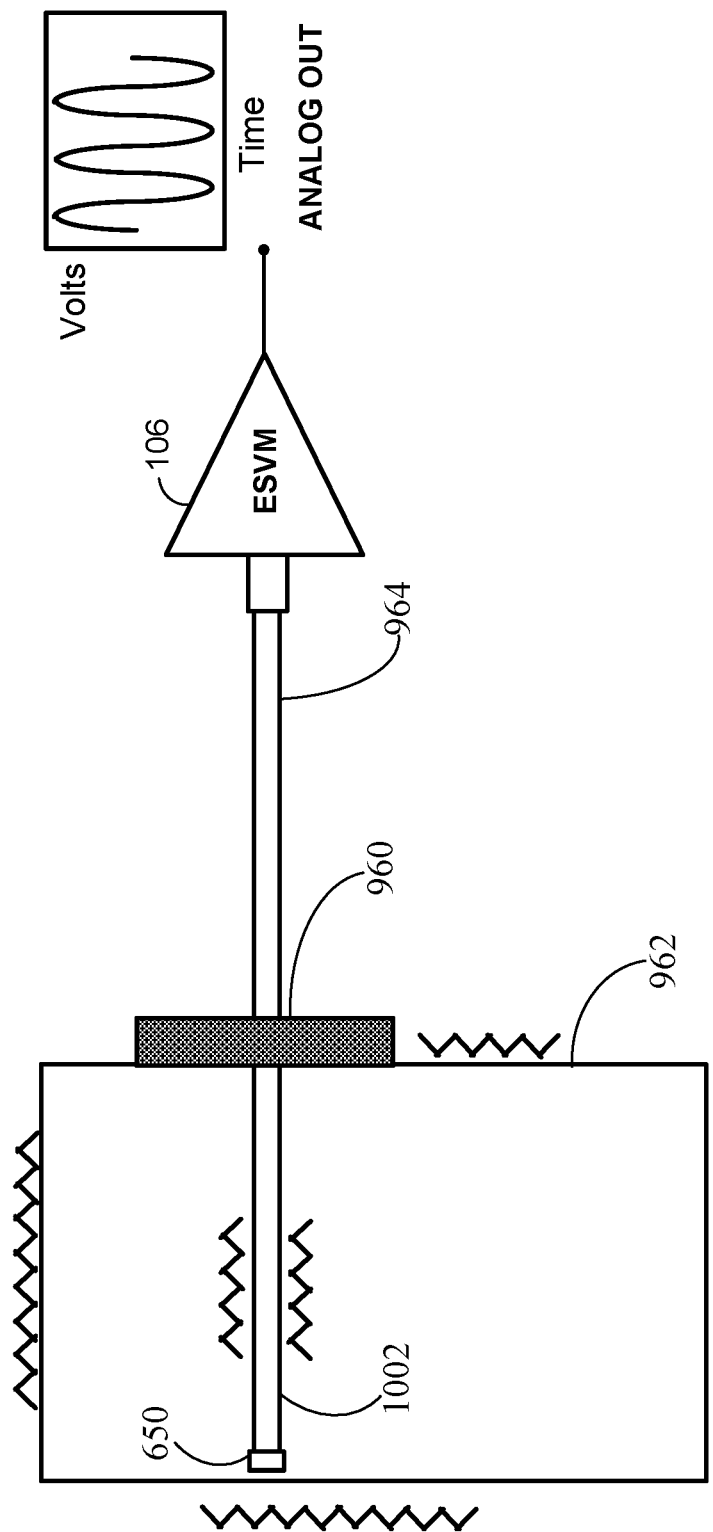
FIG. 16 depicts an additional vibration sensing application.

The cable 1002 may also be positioned within the plasma processing chamber 962 as shown in FIG. 16. As depicted, the cable 1002 may be used within the plasma processing chamber 962 while a standard ESVM cable 964 may be utilized outside of the plasma processing chamber 962. The cable 1002 may couple to the standard ESVM cable 964 within, or in close connection with, a chamber feed through portion 960. If copper cannot be used in the harsh environment of the chamber 962, the cable 1002 may include an outer shield that includes a metal (e.g., silver).

The previous description of the disclosed embodiments are provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system for monitoring an environmental temperature parameter, the system comprising:
   a cable configured to produce a triboelectric signal in response to expansion or contraction of at least a portion of the cable, wherein the cable includes at least two conductors separated by a dielectric, and wherein at least one of the conductors is configured to propagate the triboelectric signal;
   a voltmeter coupled to the cable and configured to provide an output signal responsive to the triboelectric signal; and
   a conversion module configured to convert the output signal to one or more parameter values indicative of the environmental temperature parameter.

2. The system of claim 1, wherein the cable is a coaxial cable.

3. The system of claim 2, wherein the coaxial cable is a semi-rigid coaxial cable of which the outer conductor of the at least two coaxial conductors is a solid outer jacket allowing thermal expansion or contraction forces to be directed on internal portions of the coaxial cable.

4. The system of claim 1, wherein the cable is a cable of less than 1.0 mm diameter.

5. The system of claim 1, wherein the cable is a cable of around 0.4 to 0.8 mm diameter.

6. The system of claim 1, wherein the conversion module includes:
characterization data that includes a plurality of data pairs, wherein each data pair includes a parameter value and a corresponding stored signal value; and
wherein the conversion module is configured to obtain a signal value from the output signal of the voltmeter and obtain a corresponding temperature parameter value from the characterization data.

7. The system of claim 1, wherein the voltmeter is an electrostatic voltmeter.

8. The system of claim 1, further comprising an interface to provide a usable representation of the one or more parameter values.

9. The system of claim 1, further comprising a shielded cap attached to an end of the cable.

10. The system of claim 1, further comprising a voltmeter cable coupled to the triboelectric producing cable.

11. A method for monitoring an environmental temperature parameter, the method comprising:
exposing a cable to a variable environmental temperature parameter, wherein the cable includes at least two conductors separated by a dielectric, and wherein the cable changes shape by thermal expansion or contraction in response to changes in the variable environmental temperature parameter;
monitoring a triboelectric signal on at least one of the conductors of the cable with a voltmeter to obtain an output signal;
accessing characterization data using the output signal to obtain a stored temperature parameter value for the environmental temperature parameter; and
managing an aspect of the monitored environment using the temperature parameter value and/or presenting the temperature parameter value to an operator.

12. The method of claim 11, wherein exposing the cable includes exposing a coaxial cable to the variable environmental temperature parameter.

13. The method of claim 11, wherein exposing the cable includes exposing a micro cable of less than 1.0 mm diameter to the variable environmental temperature parameter.

14. The method of claim 13, wherein the cable is around 0.4 to 0.8 mm diameter.

15. The method of claim 11, wherein accessing characterization data includes:
obtaining a signal value from the output signal of the voltmeter; and
accessing a plurality of data pairs to obtain the stored temperature parameter value corresponding to the signal value, wherein each data pair includes a parameter value and a corresponding stored signal value.

16. The method of claim 11, wherein the voltmeter utilized in the triboelectric signal monitoring is an electrostatic voltmeter.

17. The method of claim 11, wherein exposing the cable includes positioning at least a portion of the cable into a bore of heat-conducting mass.

18. The method of claim 11, wherein exposing the cable includes feeding at least a portion of the cable into a containment vessel and positioning at least a portion of the cable within a non-solid body within the containment vessel.

19. The method of claim 18, wherein the non-solid body is a liquid or a powder.

20. The method of claim 11, wherein the monitored environment is a plasma processing chamber.

* * * * *